(12) United States Patent
Tewinkle et al.

(10) Patent No.: US 8,130,420 B2
(45) Date of Patent: Mar. 6, 2012

(54) SYSTEM FOR PROGRAMMING A PLURALITY OF CHIPS, SUCH AS PHOTOSENSOR CHIPS OR INK-JET CHIPS, WITH OPERATING PARAMETERS

(75) Inventors: Scott L. Tewinkle, Ontario, NY (US); Paul A. Hosier, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1532 days.

(21) Appl. No.: 11/588,904

(22) Filed: Oct. 26, 2006

(65) Prior Publication Data
US 2008/0111888 A1    May 15, 2008

(51) Int. Cl.
*H04N 1/40* (2006.01)
(52) U.S. Cl. ............................................. 358/443
(58) Field of Classification Search .................. 358/400, 358/443, 448
See application file for complete search history.

(56) References Cited

U.S. PATENT DOCUMENTS

| | | | | |
|---|---|---|---|---|
| 4,796,280 | A | * | 1/1989 | Nesin et al. .................. 375/360 |
| 4,977,304 | A | * | 12/1990 | Ino et al. ..................... 250/208.1 |
| 6,061,417 | A | * | 5/2000 | Kelem ............................ 377/26 |

OTHER PUBLICATIONS

U.S. Appl. No. 11/143,173, filed Jun. 2, 2005.
U.S. Appl. No. 11/158,571, filed Jun. 22, 2005.

\* cited by examiner

*Primary Examiner* — Benny Tieu
*Assistant Examiner* — Jeremiah Bryar
(74) *Attorney, Agent, or Firm* — Simpson & Simpson, PLLC

(57) ABSTRACT

An imaging system, such as having pixel-sized photosensors for recording images, or light emitters or ink-jet ejectors for creating images, comprises a plurality of chips. Each chip includes a shift register with a shift-register-in line; a set of imaging elements associated with the shift register; and a program line, for accepting a program enable signal enabling acceptance of control data relating to a desired operating parameter of the chip. A control system is operable in a first mode wherein each chip in the plurality of chips receives the program enable signal directly through the program line, and a second mode wherein each chip receives the program enable signal through the shift-register-in line.

7 Claims, 6 Drawing Sheets

SYSTEM FOR PROGRAMMING A PLURALITY OF CHIPS, SUCH AS PHOTOSENSOR CHIPS OR INK-JET CHIPS, WITH OPERATING PARAMETERS

TECHNICAL FIELD

The present description relates to imaging chips, herein defined as chips that record images as digital data, such as photosensor chips, or produce images based on input digital data, such as laser emitting chips of ink-jet printheads.

BACKGROUND

Image sensor arrays typically comprise a linear array of photosensors which raster scan an image-bearing document and convert the. microscopic image areas viewed by each photosensor to image signal charges. Following an integration period, the image signal charges are amplified and transferred as an analog video signal to a common output line or bus through successively actuated multiplexing transistors.

For high-performance image sensor arrays, a preferred design includes an array of photosensors of a width comparable to the width of a page being scanned, to permit one-to-one imaging generally without the use of reductive optics. In order to provide such a "full-width" array, however, relatively large silicon structures must be used to define the large number of photosensors. A preferred technique to create such a large array is to make the array out of several butted silicon chips. In one proposed design, an array comprises of 20 silicon chips, butted end-to-end, each chip having 372 active photosensors spaced at 600 photosensors per inch.

Besides photosensor arrays, there are other types of multi-chip systems useful in recording or making images. In xerographic systems, there can be provided "LED arrays," meaning chips in which a linear array of a laser emitters are used to discharge imagewise areas on a photoreceptor for xerographic printing purposes. Also, many designs of inkjet printheads include, on a chip, a series of independently-addressable ink-jet emitters.

Whether an imaging chip is used for recording images or creating images, a common feature in such chips is the use of a shift register, the stages of the shift register being in various possible ways associated with the different "imaging elements" (e.g., photosensors, light emitters, ink-jet emitters, and associated circuitry), so that individual imaging elements can be addressed at various times, such as for image input or image readout.

In any multi-chip imaging system, there will be occasions when operating instructions or parameters are desired to be communicated to one or more chips in the system. In the case of a photosensor chip, such parameters may include offset and gain values, or duration of integration times. In other types of imaging chips, the parameters may include operating voltages or temperatures, or pulse durations. In different situations, it may be desired to communicate the same parameter data to all chips in a system, or to direct a parameter to a specific chip in a multi-chip system.

U.S. patent application Ser. No. 11/143,173 (filed Jun. 2, 2005) and U.S. patent application Ser. No. 11/158,571 (filed Jun. 22, 2005) relate to directing data related to a desired operating parameter to each of a plurality of photosensor chips.

SUMMARY

According to one aspect, there is provided an imaging system, comprising a plurality of chips. Each chip includes a shift register operable with a shift register in another chip in the plurality of chips, the shift register being associated with a shift-register-in line; a set of imaging elements associated with the shift register; a program line, for accepting a program enable signal enabling acceptance of control data relating to a desired operating parameter of the chip; and a selector for selectably causing data entered on the shift-register-in line to be directed to the program line. A control system governs the plurality of chips, the control system. interacting with the selector of each chip. The control system is operable in a first mode wherein each chip in the plurality of chips receives the program enable signal directly through the program line, and a second mode wherein each chip receives the program enable signal through the shift-register-in line.

DETAILED DESCRIPTION

FIGS. 1A-1D are simplified plan views of a system of multiple imaging chips and associated wiring, as would be found, for example, in a page-width photosensor array, LED array, or ink-jet printhead. Each chip 10 includes an array of imaging elements (not shown), examples of which are given above, and a set of input and output lines that interact with circuitry on each chip, such as including a shift register. In the various FIGS. 1A-1D, the basic layout of the butted chips are the same, but each arrangement differs in the character of the wiring (such as on a printed circuit board) that enables all the chips to act in a coordinated manner. In a specific example, the chips 10 act in a coordinated manner in the sense that the shift register on each chip 10 can be made to cooperate with the shift registers in neighboring chips 10, so that the entire multi-chip system can act as though controlled by a single shift register.

In the various FIGS. 1A-1D, each chip 10 has the same set of input and output lines: SRI/OE, which is a shift-register-in,. or output-enable, line; a clock line ΦS, which accepts an external clock signal, such as to help the passage of signals through the shift register; a program line PROG, which accepts an external "program enable" signal that enables programming of the chip; a program clock line PCLK, which is used to synchronize image sensor control data; a data-in line DIN, which typically accepts inputs of image sensor control data (i.e., data relating to a desired operating parameter of the chip); a data-out line DOUT, from which image sensor control data can be read out of the chip; and a shift register out line SRO, which relates to the end of a the chip's shift register opposite that of the SRI/OE line. It will be noted, in the FIG. 1A and 1C embodiments, that the SROUT line of a chip is linked to the SRI/OE line of a neighboring chip: in this way, the shift registers of adjacent chips can be in effect chained together to form a single shift register. It should also be noted that the inputs DIN, PROG, and PCLK represent parts of what is known in the art as a "three-wire programming interface."

Figure 1A:
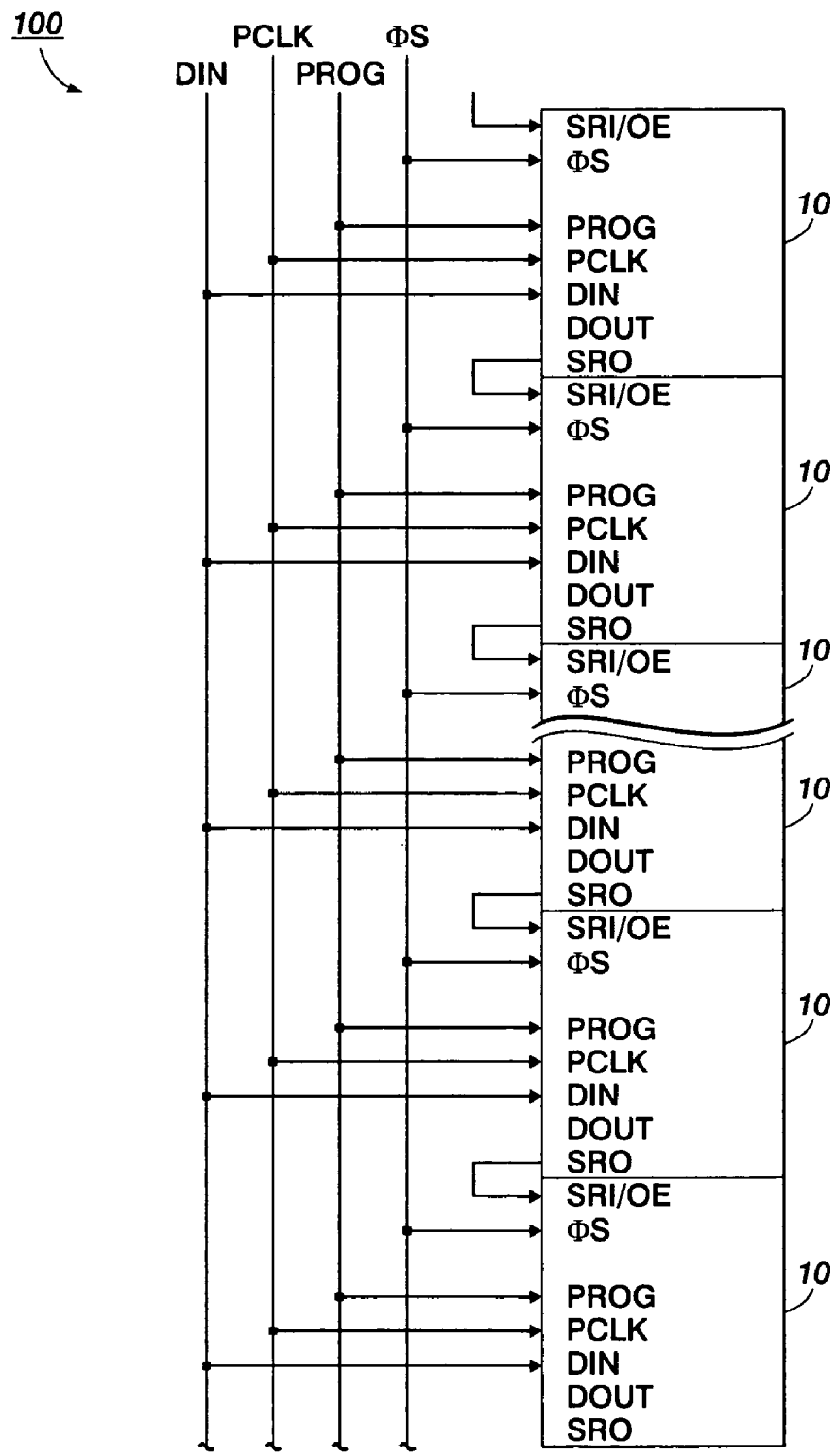
FIGS. 1A-1D are simplified plan views of a system of multiple imaging chips and associated wiring, as would be found, for example, in a page-width photosensor array, LED array, or ink-jet printhead.
Figure 1B:
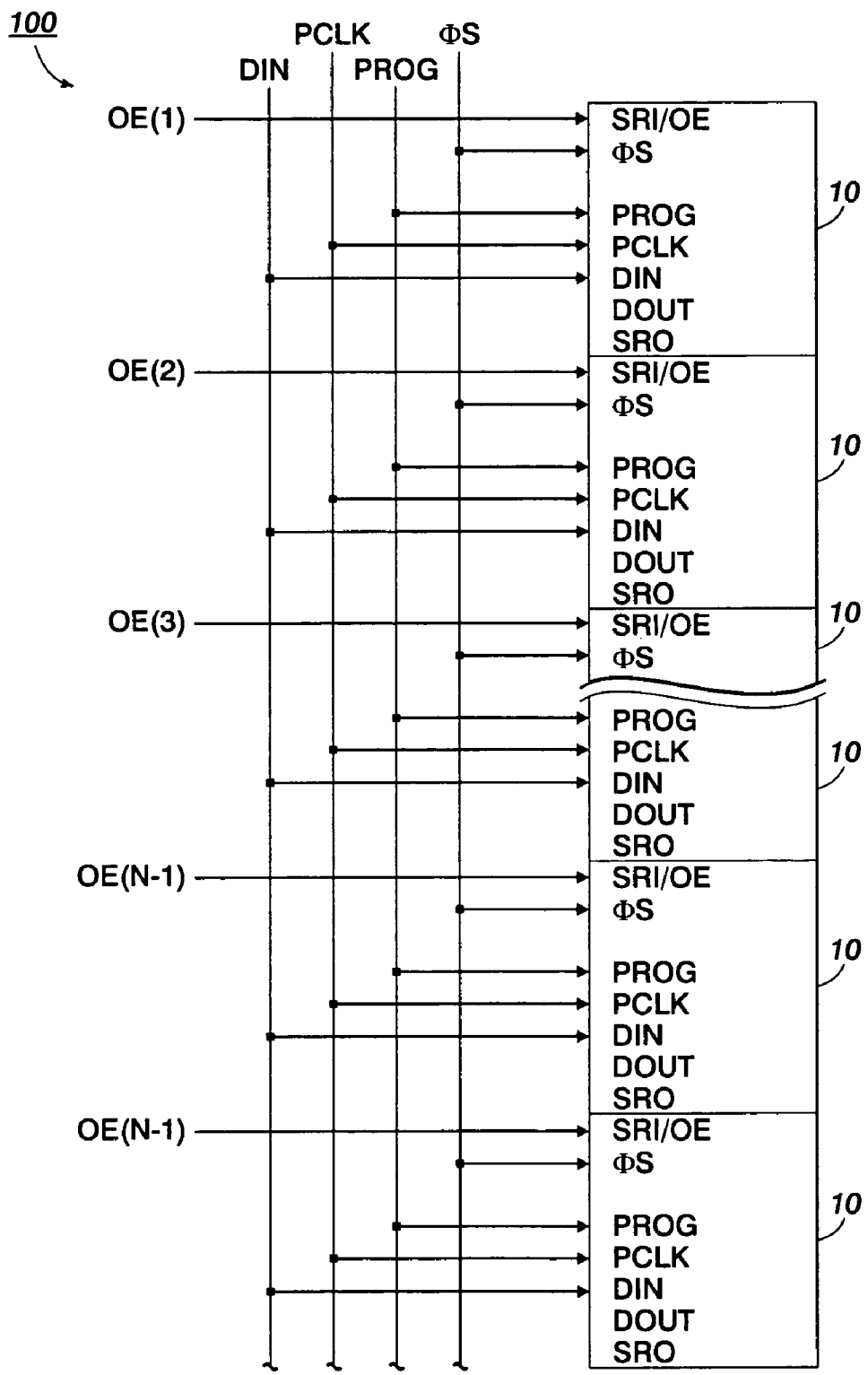
Figure 1C:
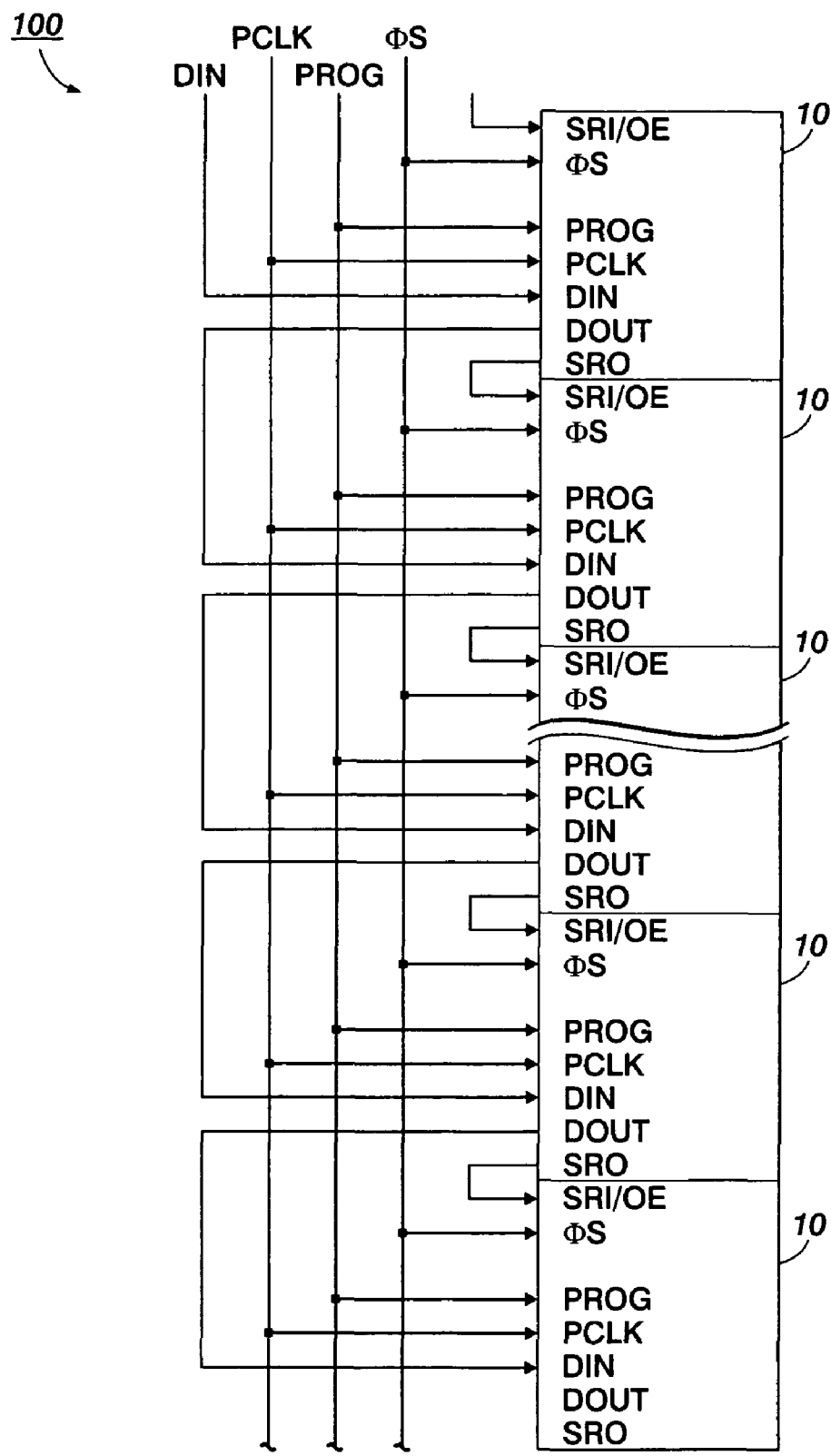

In the various FIGS. 1A-1D, the basic layout of the butted chips are the same, but each arrangement differs in the character of the wiring 100 (such as on a printed circuit board) that enables all the chips to act in a coordinated manner. In brief, the FIG. 1A wiring enables serial video control (i.e., the respective shift registers in each chip are linked together in series) with parallel programming (i.e., all of the DIN lines on the chips are connected to a common line); FIG. 1B enables parallel video control (i.e., each SRIN/OE line is individually controllable) with parallel programming; FIG. 1C enables serial programming (i.e., image sensor control data passes trough every chip, going into the DIN line and coming out the DOUT line of each chip) with serial video control; and FIG. 1D enables parallel video control with serial programming. Different wiring arrangements reflect different requirements of a larger system, such as a digital scanner or printer.

In a practical embodiment, printed wiring boards such as for wiring 100 are easier to design and manufacture than new designs of imaging chips. Therefore, it would be desirable to design an imaging chip 10 which can be readily adapted, typically only by the loading of data therein, to act in a desired manner regardless of the configuration of the wiring board, such as in the examples shown in FIGS. 1A-1D.

Figure 2:
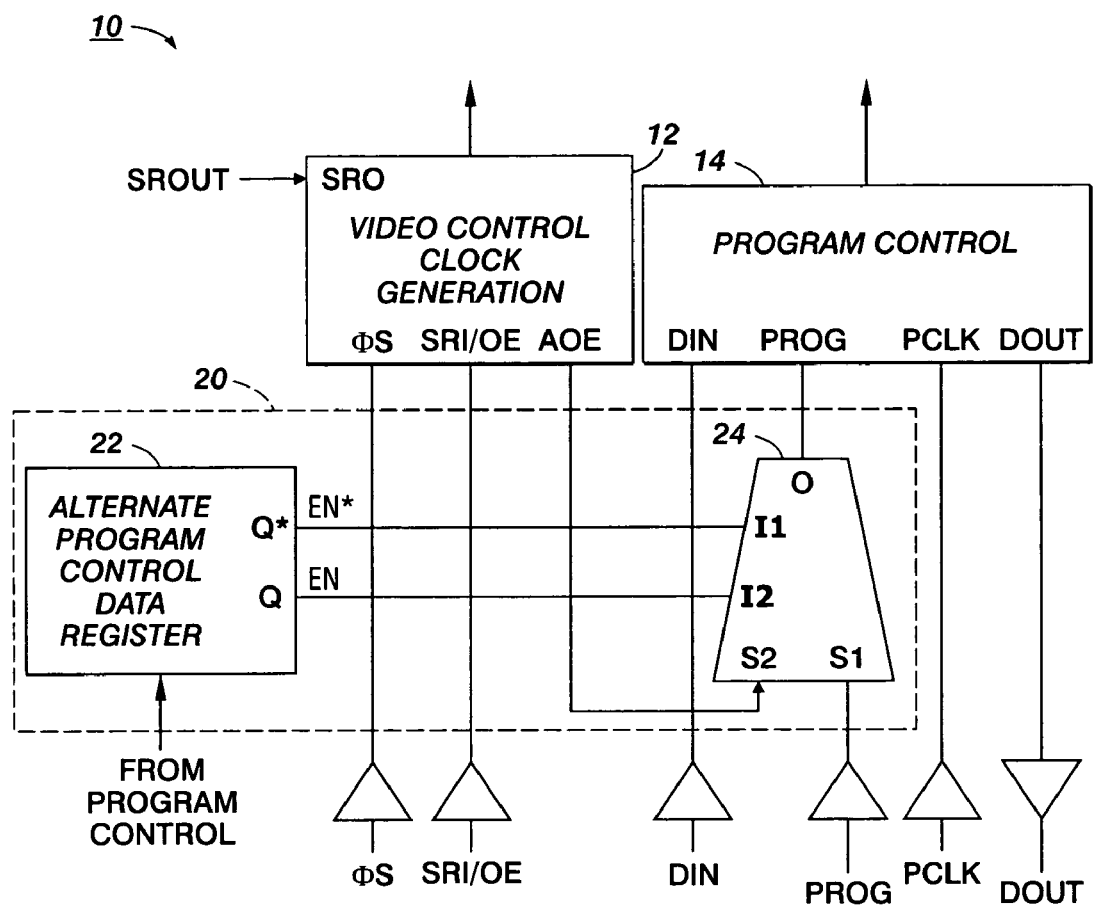
FIG. 2 is a schematic diagram of a portion of an imaging chip, according to an embodiment.

FIG. 2 is a schematic diagram of a portion of a chip 10, showing how the input and output lines as described above can be adapted, by a relatively small modification to the basic chip design, to operate in parallel or serial programming modes. In FIG. 2, the above-described input and output lines on a chip 10 are shown interacting with a video clock generation module 12 and a program control module 14. The video clock generation module 12 ultimately outputs, in this embodiment, video readout and processing control signals, such as for operating an array of photosensors and associated transfer circuits (not shown). The program control module 14 ultimately outputs, in this embodiment, data associated with the frame registers of the array of photosensors. One output of the video clock generation module 12 is an internal signal here called AOE, which can be generalized as a "chip enable function": as a practical matter, it is a useful signal to "tap" because it acts as a version of the input on SRI/OE, with a known fixed delay.

The circuitry and elements in the area marked 20 represent the modification of the present embodiment over a basic design. As shown, the modification 20 includes a one-bit register 22, outputting two lines to a selector 24. The one-bit register 22 can be loaded with a value through an external signal, typically upon the installation of a chip 10 among wiring such as 100, but also, in some possible embodiments, while the chip is in use. The selector 24 accepts inputs from the external PROG line and the internal AOE line, described above, and outputs one of the lines to the PROG input to program control module 14. Depending on whether the value held at register 22 is 1 or 0, the selector 24 will send to the PROG input either the unchanged PROG signal, or the internal AOE signal. Once the PROG line to program control 14 accepts the program enable signal, DIN can accept the control data, relating to a desired operating parameter of the chip.

Once again, if it is desired to send data relating to an operating parameter to a particular chip 10, in a basic case, such data enters each chip through the DIN input. As can be seen in FIG. 2, the circuitry and elements in the area marked 20 allow the basic PROG input to be entered either through the traditional PROG line or, effect, through the SRI/OE line via the AOE signal through selector 24. By selecting whether the external PROG signal or the AOE signal is actually used as the PROG input at any time, the chip 10 can be used for serial or parallel programming, i.e., if the PROG input is selected, the input parameter can enter the chip 10 through the control of a dedicated PROG line, such as shown in FIGS. 1A and 1B.

If the selector 22 is used to cause the AOE signal (in effect a delayed SRIN/OE signal) to input into the PROG input of program control module 14, data relating to an operating parameter can in effect enter chip 10 through the control of the SRIN/OE line, for serial programming.

Figure 3:
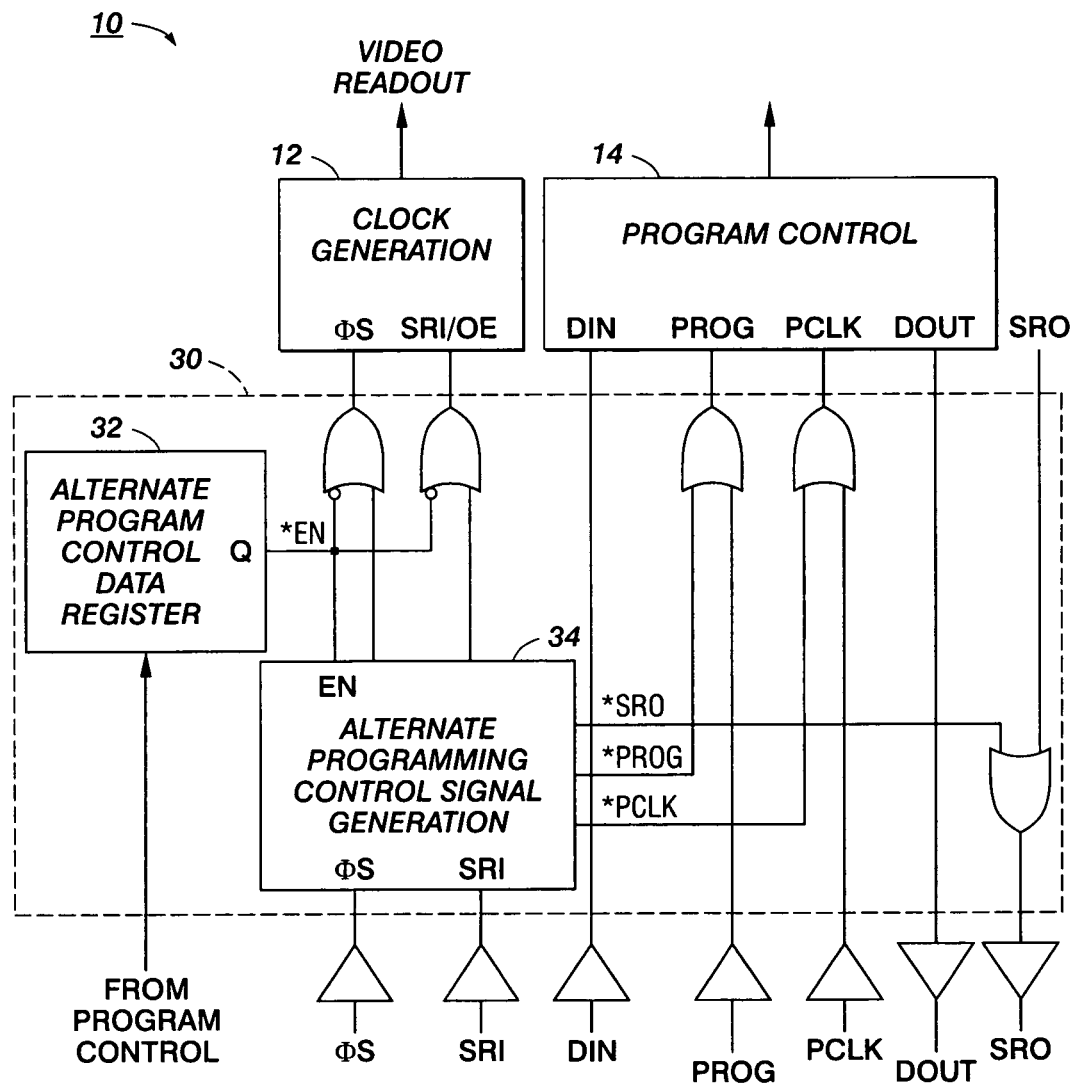
FIG. 3 is a schematic diagram of a portion of an imaging chip, according to another embodiment.

FIG. 3 is a schematic diagram of a portion of an imaging chip, according to another embodiment. The circuitry and elements in the area marked 30 represent modifications over the basic prior-art elements such as shown in FIG. 2. A data register 32 acts analogously to the register 22 described above. A signal generator 34 is connected as shown through a series of gates with the various lines as described above. The illustrated arrangement of elements sets up a set of alternate (*) (not necessarily inverse) signals as follows: *EN is simply the control bit that switches between serial and parallel programming; *SRO is the signal that replaces the output of the last shift register and is output to SRI of the next chip; *PROG, created by SRI and *SRO, is the alternative to the external PROG for serial programming; and *PCLK is the alternate to PCLK for serial programming. For the FIG. 3 embodiment, *PCLK is the pixel clock.

With the FIG. 3 embodiment, one does not need the PROG or PCLK wire bond on each chip. Also the FIG. 3 arrangement uses the pixel clock as PCLK and creates a new chip enable signal, such as described as AOE with regard to FIG. 2. This chip enable signal is much shorter than in FIG. 2 and allows the programming to be done with a lesser number of clock cycles.

Figure 1D:
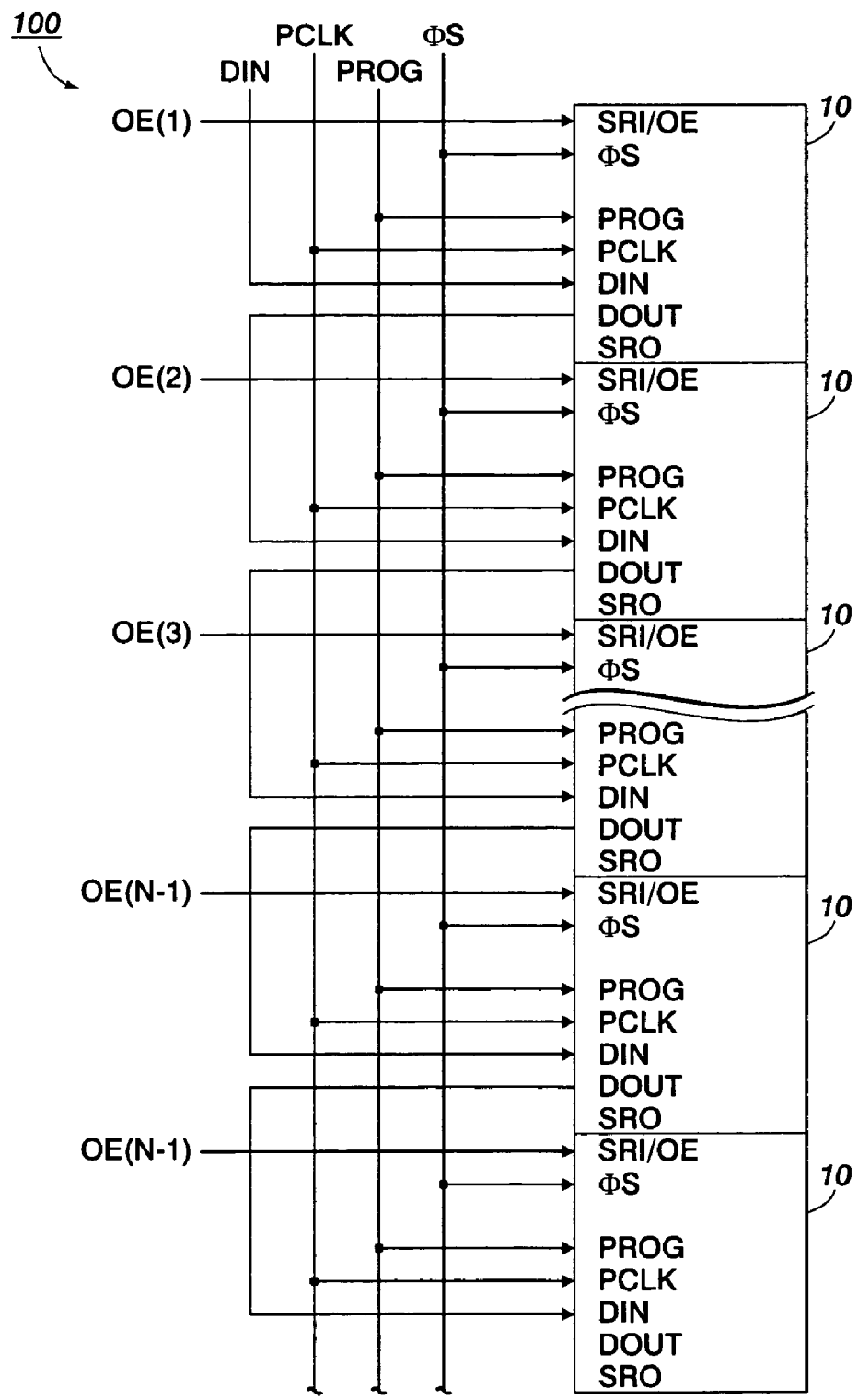

To program each chip 10 with different program data, in the basic case (that is, without the circuitry 20 or 30) one would need to use the wiring configuration of FIGS. 1C or 1D, which requires the extra DOUT wire bond on each chip. Any extra wire bonds will have a cost impact in a manufacturing situation. With the circuitry 20 or 30, one can use the wiring arrangements of FIGS. 1A or 1B and also do common and/or chip specific programming without the extra DOUT wire bond and without changing the printed wiring board.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:
1. an imaging system, comprising:
a plurality of chips, each chip including:
  a shift register operable with a shift register in another chip in the plurality of chips, the shift register connected to a shift-register-in line and a first line,
  set of imaging elements associated with the shift register,
  a program line, for accepting a program enable signal enabling acceptance of control data relating to a desired operating parameter of the chip; and
a control system, governing the plurality of chips and comprising a selector connected to:
  the program line;
  the first line;
  at least one second line; and
  a program enable line for said each chip, wherein for receipt of a first signal on the at least one second line:
    the selector transmits the program enable signal on the program enable line via the program line; or
    the selector transmits the program enable signal on the program enable line via the shift-register-in line and the first line.

2. The system of claim 1, further comprising a register connected to the at least one second line and to a third line, and arranged to transmit the second signal in response to a third signal, generated outside of said each chip, received on the third line; wherein:
when the selector transmits the program enable signal on the program enable line via the connection to the program line, a first mode of operation for said each chip is enabled; and,
when the selector transmits the program enable signal on the program enable line via the shift-register-in line and the first line, a second mode of operation for said each chip is enabled.

3. The system of claim 2, wherein the third signal is a one-bit input.

4. The system of claim 1, each chip including a data-in line for accepting the control data relating to a desired operating parameter of the chip.

5. The system of claim 4, wherein the data-in line accepts the control data following the program line accepting the program enable signal.

6. The system of claim 1, each imaging element in each chip including at least one of a photosensor, light emitter, and ink-jet emitter.

7. An imaging system, comprising:
a plurality of chips, each chip including:
a shift register operable with a shift register in another chip in the plurality of chips, the shift register connected to a first line and to a shift-register-in line;
a set of imaging elements associated with the shift register; and
a program line, for accepting a program enable signal enabling acceptance of control data relating to a desired operating parameter of the chip; and
a control system including:
a register connected to second, third, and fourth lines; and
a selector connected to:
the third and fourth lines;
the program line; and
a program enable line for said each chip, wherein:
first and second signals transmitted on the third and fourth lines, respectively, are selectable according to a third signal received on the second line;
for receipt of the first signal, the selector transmits the program enable signal on the program enable line via the program line to enable a first mode for said each chip; and
for receipt of the second signal, the selector transmits the program enable signal on the program enable line via the shift-register-in line and the first line to enable a second mode for said each chip.

* * * * *